(12) United States Patent
Wagner et al.

(10) Patent No.: US 6,594,160 B2
(45) Date of Patent: *Jul. 15, 2003

(54) POWER SUPPLY UNIT INCLUDING AN INVERTER

(75) Inventors: Bernhard Wagner, Hamburg (DE); Olaf Märtens, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/246,193

(22) Filed: Sep. 18, 2002

(65) Prior Publication Data

US 2003/0021135 A1 Jan. 30, 2003

Related U.S. Application Data

(63) Continuation of application No. 09/889,467, filed as application No. PCT/EP00/11404 on Nov. 15, 2000, now Pat. No. 6,477,062.

(30) Foreign Application Priority Data

Nov. 19, 1999 (DE) .......................... 199 55 673

(51) Int. Cl.[7] .......................... H02M 3/335; H02M 1/12
(52) U.S. Cl. .......................... 363/17; 363/41
(58) Field of Search .......................... 363/17, 19, 20, 363/39, 41, 40, 97, 98, 132

(56) References Cited

U.S. PATENT DOCUMENTS

| 4,024,453 A | * | 5/1977 | Corry .......................... 363/28 |
| 4,541,041 A | * | 9/1985 | Park et al. .......................... 363/41 |
| 4,679,129 A | * | 7/1987 | Sakakibara et al. .......................... 363/17 |

* cited by examiner

Primary Examiner—Rajnikant B. Patel
(74) Attorney, Agent, or Firm—John Vodopia

(57) ABSTRACT

The invention relates to a power supply unit with an inverter which cooperates with a resonant circuit (L, C) and can be controlled so as to adjust the output power by means of a control unit (6). The power supply unit is characterized notably by the fact that it is formed by a first and a second switching unit (S1, S4; S2, S3) whereby a voltage of a first polarity can be applied to the resonant circuit (L, C) in a first switching state and a voltage of a second polarity can be applied thereto in a second switching state, the switching states being switchable by the control unit (6) in such a manner that in a first mode of operation for low output powers the output power can be adjusted by changing the duration of the switching states at an essentially constant switching frequency fs which is at least a predetermined factor lower than the resonance frequency fres of the resonant circuit, and that in a second mode of operation for high output powers the output power can be adjusted by changing the switching frequency in the range of the resonance frequency.

9 Claims, 4 Drawing Sheets

POWER SUPPLY UNIT INCLUDING AN INVERTER

This is a continuation of application Ser. No. 09/889,467, filed Jul. 17, 2001, now U.S. Pat. No. 6,477,062, which is a 371 of PCT/EP00/11404, filed Nov. 15, 2000.

The invention relates to a power supply unit which includes an inverter which co-operates with a resonant circuit and can be controlled by means of a control unit so as to adjust the output power, notably for an X-ray generator.

A power supply unit of this kind is known from DE 197 24 931 and includes an inverter which is connected to a direct voltage source and consists of a first branch and a second branch, each branch being provided with two semiconductor switches, the output of the inverter being connected to a resonant circuit that is formed by a capacitor and the stray inductance of a transformer. An X-ray tube is connected to the secondary winding of the transformer via a rectifier device. The power supply unit can be switched between a first mode of operation with a high short time power and a second mode of operation with a low continuous power, the power output being controlled by means of a pulse width modulated voltage which is generated by switching of the semiconductor switches and is present on the output of the inverter. In order to increase the continuous power in the second mode of operation, a third branch (auxiliary branch) is connected parallel to the two inverter branches; in this second mode of operation the auxiliary branch is activated instead of the first branch in order to take up an additional inductance and an additional capacitance in the primary circuit of the transformer. The power loss in the semiconductor switches of the inverter and in the transformer is thus reduced.

Even though power control by pulse width modulation of the voltage applied to the resonant circuit can be realized comparatively simply from a technical point of view, and even though practical no switch-off losses are induced in the case of low output powers, this method also has given drawbacks. This is because high switch-on and switch-off losses occur in the case of high output powers. Moreover, as the pulse width increases the output voltage also increases.

It is an object of the invention to provide a power supply unit of the kind set forth whose modes of operation are enhanced over a comparatively wide power range and notably in respect of switching losses and ripple of the output voltage.

This object is achieved by means of a power supply unit as claimed in claim 1 which is characterized in that the inverter is formed by a first switching unit and a second switching unit whereby a voltage of a first polarity can be applied to the resonant circuit in a first switching state whereas a voltage of a second polarity can be applied thereto in a second switching state, which switching states can be switched by the control unit in such a manner that in a first mode of operation for low output powers the output power can be adjusted by changing the duration of the switching states at an essentially constant switching frequency fs which is at least a predetermined factor lower than the resonance frequency fres of the resonant circuit, and that in a second mode of operation for high output powers the output power can be adjusted by changing the switching frequency in the range of the resonance frequency.

Thus, the basic idea of the invention is to optimize the properties of a power supply unit of the kind set forth by activation of different modes of operation in dependence on the output power.

Advantageous further embodiments of the invention are disclosed in the dependent claims.

The embodiment disclosed in claim 2 includes an inverter in the form of a half bridge (two semiconductor switches) whereas a full bridge circuit is provided according to claim 4 (four semiconductor switches).

When a third switching state is activated as a free-running state in conformity with claim 5, the peak values of the resonance current amplitudes are lowered, the losses are reduced further and the switching powers are halved. Moreover, the resonant circuit capacitance C is relieved by the unidirectional power flow.

In order to achieve optimum properties of the power supply unit, the factor whereby the switching frequency fs in the first mode of operation is smaller than the resonance frequency is preferably 0.5 in conformity with claim 6, whereas in conformity with claim 7 the switching frequency fs can be varied in the range 0.5*fres □ fs<fres in the second mode of operation.

Finally, the embodiment disclosed in claim 8 involves a third mode of operation which can be effectively used notably for a medium range of the output power.

Further details, characteristics and advantages of the invention will become apparent from the following description of two preferred embodiments which is given with reference to the drawing. Therein:

The embodiments to be described hereinafter are preferably used for the power supply of X-ray tubes. For these and other, similar applications the intermediate circuit voltage $U_{DC}$ amounts to a few 100 V, notably 750 V. Suitable values for the resonance frequency of the resonant circuit amount to a maximum of from approximately 200 to 300 kHz; in that case currents of up to a few 100 A may flow. Voltages of from a few 10 kV to more than a few 100 kV can then be generated across the load resistor $R_L$ for output currents of from approximately 0 to more than 1 A.

Figure 1:
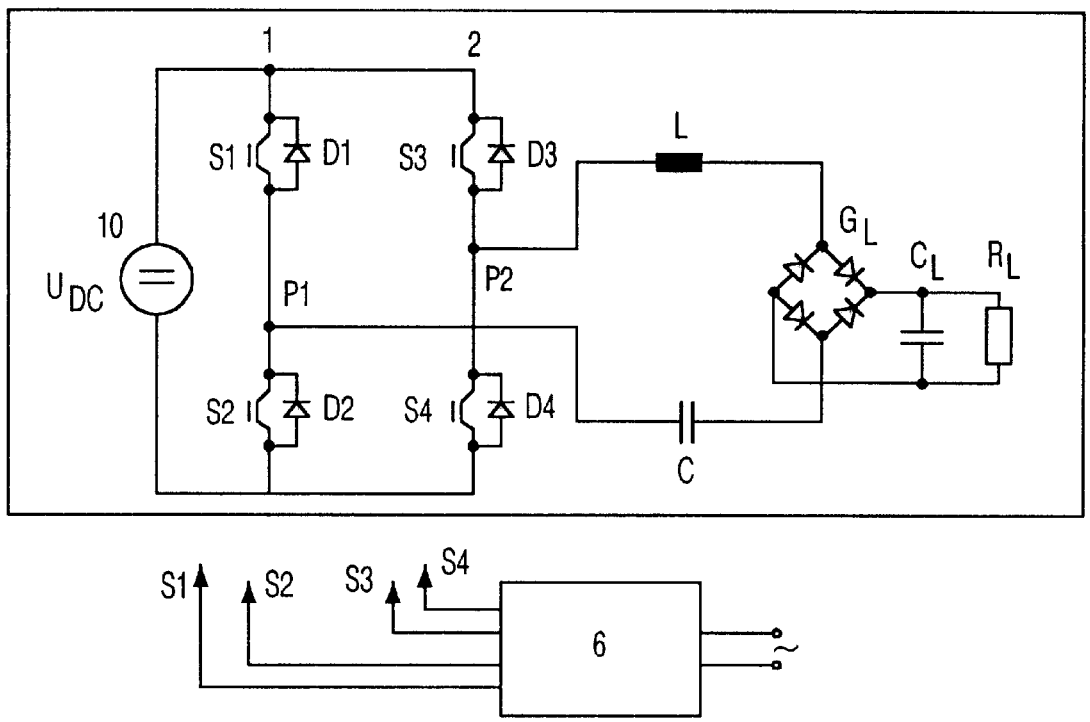
FIG. 1 shows a circuit diagram of the first embodiment of the invention.

A first embodiment of the power supply unit according to the invention is shown in FIG. 1 and includes a direct voltage source 10 (intermediate circuit voltage $U_{DC}$) whereto a first branch 1 and, parallel thereto, a second branch 2 of an inverter are connected. The first branch 1 includes a first semiconductor switch S1 and a second semiconductor switch S2 (for example, switching transistors) which are connected in series. A first free running diode D1 and a second free running diode D2 are connected anti-parallel (that is, with the reverse forward direction with respect thereto) to the first and the second semiconductor switch, respectively. Similarly, the second branch 2 is formed by a third semiconductor switch S3 and a fourth semiconductor switch S4 (for example, again switching transistors) which are connected in series. Anti-parallel to the third and the fourth semiconductor switch there is connected a third and a fourth free running diode D3, D4, respectively. The junction of the first and the second semiconductor switch S1, S2 constitutes a first output terminal P1 of the inverter whereas a second output terminal P2 of the inverter is branched from the junction of the third and the fourth semiconductor switch S3, S4.

The output terminals P1, P2 of the inverter are connected to a series resonant circuit which is formed by an inductance L as well as a capacitance C connected in series therewith. A bridge rectifier G1 whose output is connected to a load $R_L$ via a smoothing capacitor $C_L$ is connected between the elements L and C.

A preferably programmable control unit 6 generates switching signals for each pair of switches S1/S4 and S2/S3, which switching signals alternately switch these pairs to the conductive state and the blocked state so that respective square-wave voltages of alternating polarity are present on the first and the second output terminal P1, P2 of the inverter, said square-wave voltages constituting a (resonance) tank voltage Utank for the resonant circuit. The control unit can also produce this pulse pattern by closing individual switches in such a manner that a free-running state is imposed on the resonant circuit. To this end, for example the first switch S1 is switched to its conductive state during the conductive phase of the third diode D3 while the third switch S3 is switched to its conductive state during the conductive phase of the first diode D1, the fourth switch S4 is switched to its conductive state during the conductive phase of the second diode D2 or the second switch S2 is switched to its conductive state during the conductive phase of the fourth diode D4, or the first and the third switch S1/S3 are switched to their conductive state or the second and the fourth switch S2/S4. In these cases the voltage on the first and the second output terminal P1, P2 is composed only of the forward voltages of a diode and a (conductive) switch or two conductive switches and, generally speaking, is very low relative to the intermediate circuit voltage $U_{DC}$. A suitable control unit is disclosed, for example, in DE OS 19724931.

Depending on the selected mode of operation and the value of the power output in the selected mode of operation, either the pulse duration or the frequency of this tank voltage Utank is varied or a free-running state is activated.

The variation of the tank voltage, causing a corresponding variation of the resonance current through the inductance, the rectifier as well as the capacitance, can produce a rectified output voltage of adjustable value across the load $R_L$, the output current then being adjustable essentially continuously from approximately zero to a maximum value in conformity with the load.

The functions of the circuit and the typical variations of the tank voltage Utank and the current Ires through the resonant circuit will be described in detail hereinafter with reference to the FIGS. 2 to 6 and for various modes of operations, with and without a free running state.

Figure 2:
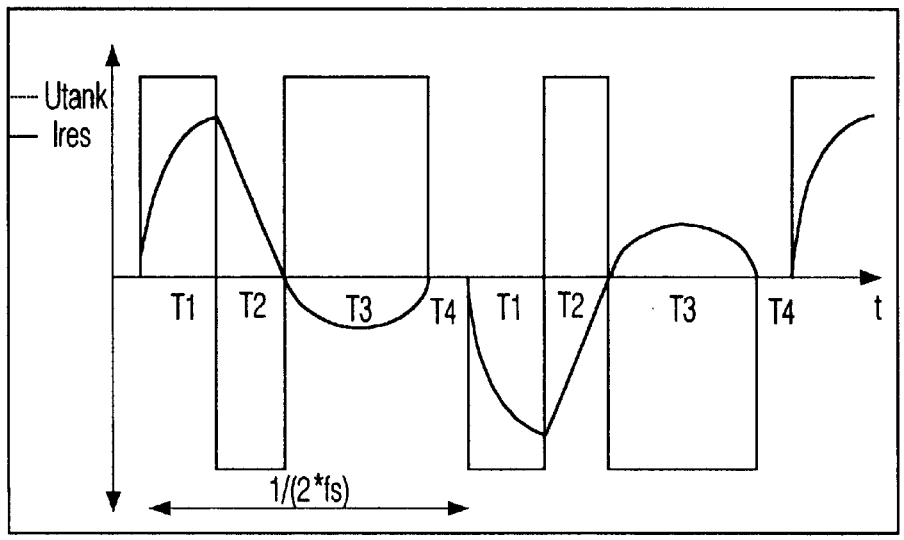
FIG. 2 shows typical current and voltage variations during a first mode of operation without a free-running state.

FIG. 2 shows such variations for a first mode of operation for low output powers and without a free running state. In this mode of operation the power is adjusted by pulse width modulation of the tank voltage, that is, the duration (first phase) T1, whereby each pair of switches S1/S4 and S2/S3 is switched to the conductive state. The switching frequency fs (frequency of the switching operations) is constant and less than half the resonance frequency fres of the resonant circuit.

During the first phase T1 the first and the fourth switch S1, S4 are conductive whereas the second and the third switch S2, S3 are blocked. During this phase an essentially sinusoidal current Ires is built up in the resonant circuit until the first and the fourth switch S1, S4 are opened again, that is, switched to the blocked state. While the current Ires commutes from the switched-off switches S1, S4 to the anti-parallel diode D2, D3 of the respective other switch S2, S3 in the same branch, a second phase T2 commences. When the current Ires, decreasing during this second phase T2, reaches the zero line, this phase is terminated and a third phase T3 commences. During this phase the current Ires, now negative, flows via the first and the fourth diode D1, D4 which are connected anti-parallel to the first switch and the fourth switch S1, S4, respectively. Moreover, during this phase all switches are open. The third phase T3 terminates when the current reaches the zero line again. When the switching frequency fs of the tank voltage is lower than half the eigen resonance frequency fres of the resonant circuit, there will be a fourth phase T4 in which no current flows in the resonant circuit (current gap, intermittent flow of DC).

Subsequently, this procedure is repeated by the closing of the second and the third switch S2, S3 (the switches S1 and S4 are blocked); the voltage and current variations of FIG. 2 then have the same shape but the reverse polarity and commence again with the first phase T1.

This first mode of operation is not resonant, which means that the operating frequency (switching frequency fs) at which the individual switches S1/S4 and S2/S3 are switched deviates from the resonant frequency fres (at least by the factor 0.5) in such a manner that eigen dynamics cannot arise due to the eigen resonance of the resonant circuit and hence no voltage and current excess can occur either.

The maximum switch-off current occurs at the maximum of the sinusoidal current during the first phase T1 and is small in conformity with the small power that can be transferred in this mode of operation. Moreover, the switching operations for each switch take place at the selected, low operating frequency or only at half this frequency. This means that this mode of operation is characterized by particularly small switching losses.

Furthermore, the ripple of the rectified output voltage is also small in this mode of operation, because only current pulses of low amplitude are transferred at a constant switching frequency.

Power supply units controlled via pulse width have the drawback that after the switching off of one of the switch diagonals, a release time must be observed before the other switch diagonal can be switched on. This drawback does not exist in this case, because in this mode of operation it is not intended to increase the transferred power since during the third phase T3 the second switch diagonal S2/S3 (counter diagonal) is switched on. At maximum power in this mode of operation the switches can be switched to the blocked state at any instant between the first and the second current zero crossing. The second phase T2 is then possibly omitted.

Figure 3:
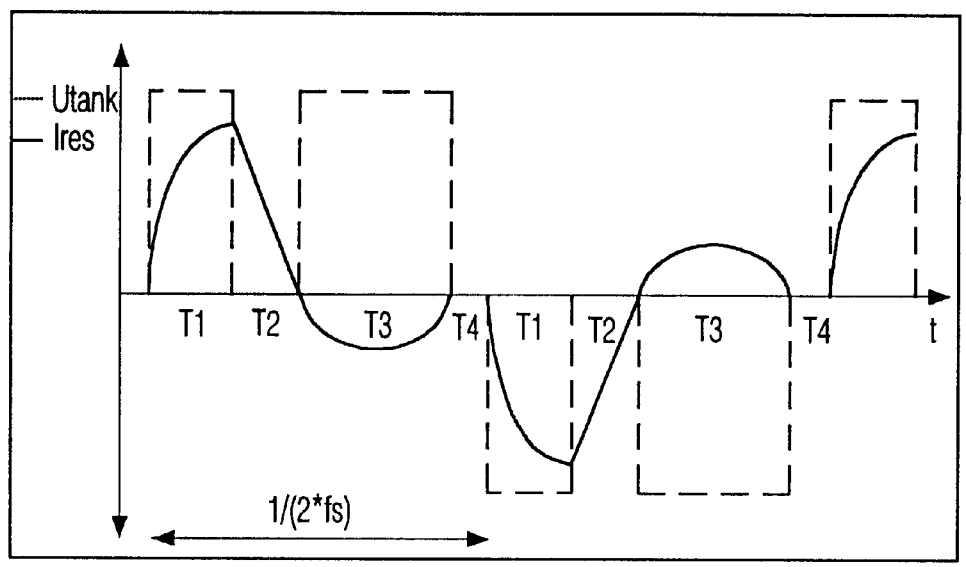
FIG. 3 shows typical current and voltage variations in the first mode of operation with a free-running state.

FIG. 3 shows the voltage and current variations in this mode of operation with a free-running state. The essential difference consists in that at the end of the first phase T1 or at the beginning of the second phase T2 only one of the two switches S1, S4 or S2, S3 is opened, so that in the second phase T2 a series connection of S1 and D3 or S4 and D2 or S3 and D1 or S2 and D4 is connected to the resonant circuit. The resultant advantages have already been described.

Figure 4:
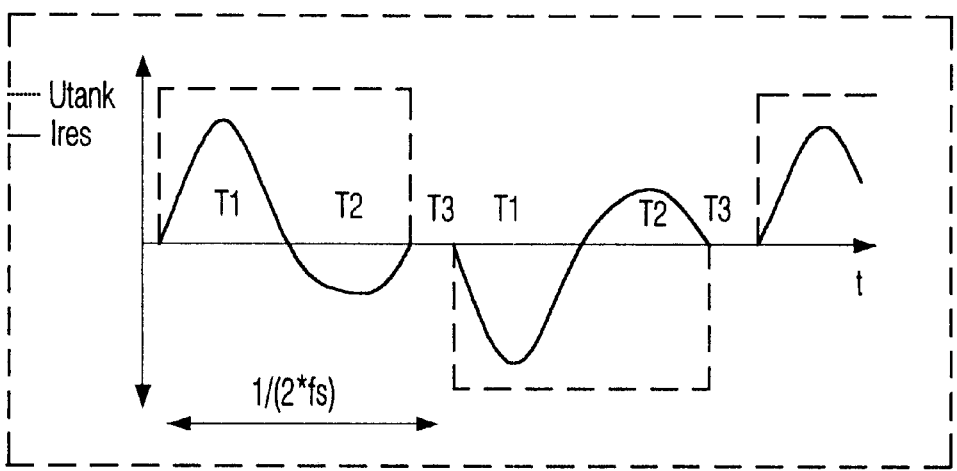
FIG. 4 shows typical current and voltage variations during a second mode of operation.

FIG. 4 shows the variations of the tank voltage Utank and the current Ires through the resonant circuit in a second mode of operation for medium output powers. The power is adjusted by variation of the switching frequency, be it subject to the following condition: fsmin|fs|7.5*fres, that is, the switching frequency fs remains essentially lower than half the eigen resonance frequency fres of the resonant circuit.

The first and the fourth switch S1, S4 are closed during the first phase T1 and the switches S2 and S4 are open. In this phase the variation of the current Ires is essentially sinusoidal and the current is not switched off. During the current zero crossing the second phase T2 commences and the current commutes from the switches S1, S4 to their anti-parallel diodes D1, D4, so that the current varies with a damped sinusoidal oscillation during the second phase T2. Subsequently, the switches S1, S4 are opened. When the current reaches the zero crossing again, this phase terminates and the third phase T3 commences in which no current Ires flows (current gap/intermittent operation with DC).

Subsequently, this sequence is repeated by closing the second and the third switch S2, S3 (the switches S1/S4 are open); in comparison with FIG. 3 the voltage and current variations then have the same shape and the reverse polarity.

The switching frequency fs remains substantially lower than the resonance frequency fres also in this second mode of operation. Therefore, eigen dynamics due to the eigen resonance of the resonant circuit, and hence voltage and current excess, again cannot occur. Because no switching off operation takes place, no switch-off losses occur. The switch-on operation is currentless, so that switch-on losses do not occur either.

In this mode of operation the maximum ripple of the rectified output voltage occurs at the minimum switching frequency, because the energy of the current packages is always the same. The ripple is so low in this mode of operation because it is not reduced further as from a minimum frequency and a change-over takes place to the pulse width modulated operation of the first mode of operation.

Figure 5:
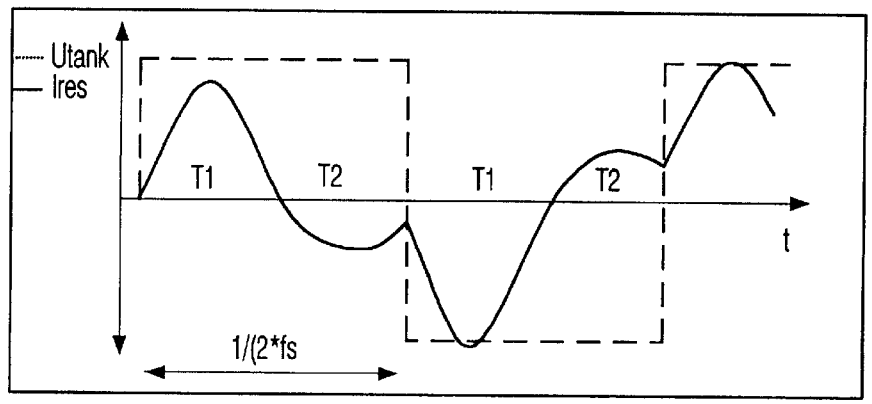
FIG. 5 shows typical current and voltage variations during a third mode of operation without a free-running state.

FIG. 5 shows the voltage and current variations in a third mode of operation for large output powers, that is, without a free running state.

The power shift is again performed via the switching frequency fs which is in the following range: $0.5*fres \lvert fs < fres$.

During a first phase T1 the first and the fourth switch S1, S4 are switched on (conductive). The current Ires through the resonant circuit then varies sinusoidally and is not switched off. During the zero crossing a second phase T2 commences in which the first and the fourth switch S1, S4 are opened in a currentless manner and a release time is observed. The current Ires commutes from the switches S1, S4 to their anti-parallel diodes D1, D4, the current variation being shaped as a damped sinusoidal oscillation in this second phase T2. No sooner than after expiration of the release time, but before the next current zero crossing, the first and the second phase T1, T2 are repeated with a reversed voltage and current polarity, that is, the second and the third switch S2, S3 are closed while the first and the fourth diode D1, D4 still carry current. In response thereto the current commutes from these diodes D1, D4 to the switches S2, S3 which are now closed. Thus, non-intermittent operation is concerned.

Figure 6:
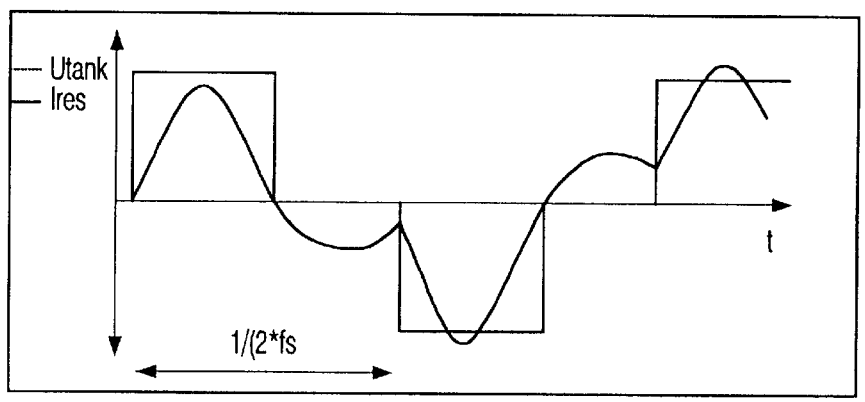
FIG. 6 shows typical current and voltage variations during the third mode of operation with a free-running state.

A free-running state can again be introduced by switching off only one of the switches that are conductive during the first phase T1 towards the end of the first phase T1 or at the beginning of the second phase T2. The output terminals P1 and P2 are thus conductively connected either via the positive or via the negative intermediate circuit rail, except for the voltage drop of a conductive switch and a conductive diode that is low in comparison with the intermediate circuit voltage. While the anti-parallel diode of the second switch present in the same branch is conductive, this switch can already be switched on without loss. The corresponding voltage and current variations are shown in FIG. 6.

The third mode of operation is a resonant mode, that is, the switching frequency fs at which the individual switches are switched deviates from the resonance frequency fres of the resonant circuit to such a small extent only that eigen dynamics can arise due to the eigen resonance of the circuit, thus giving rise to a voltage and current excess.

The maximum switch-on current lies at the maximum of the sinusoidal oscillation of the diode forward period and hence is substantially smaller than the current maximum during the phase in which the active switches are conductive.

In this third mode of operation the maximum ripple of the rectified output voltage is obtained at the maximum switching frequency, because the highest current amplitudes now occur because of the resonance effect. Advantage is taken of the fact that the higher current amplitudes are partly compensated in respect of ripple by the higher frequency.

Figure 7:
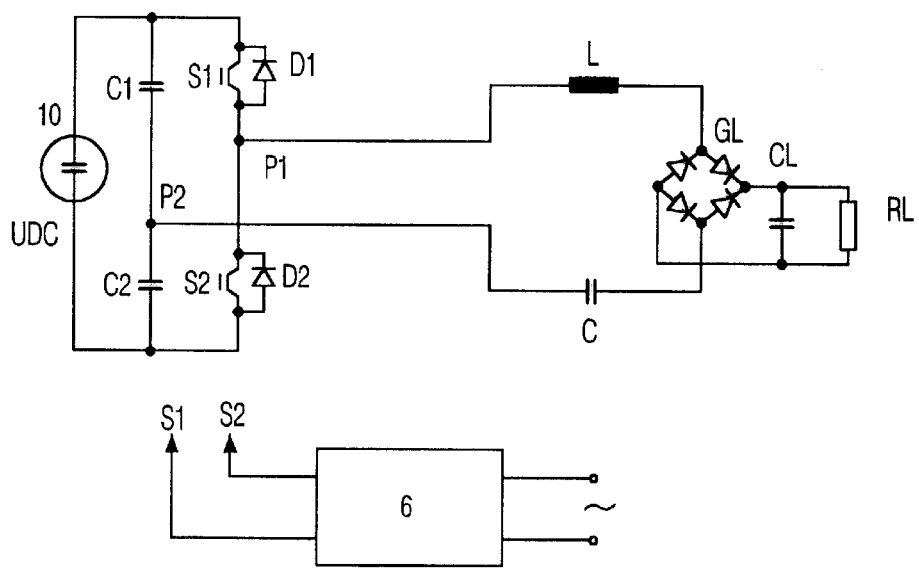
FIG. 7 shows a first circuit diagram of the second embodiment of the invention.

FIG. 7 shows a first circuit of a second embodiment of the invention. The essential difference with respect to the first embodiment consists in that now a half-bridge circuit is concerned in which a series connection of a first and a second capacitor C1, C2 is provided instead of the second inverter branch 2.

The first output terminal P1 for the resonant circuit is formed by the junction of the first and the second semiconductor switch S1, S2, whereas the second output terminal P2 is formed by the junction of the first and the second capacitor C1, C2. The semiconductor switches S1, S2 are switched again by the control unit 6.

The variations of the tank voltage Utank and of the current Ires through the resonant circuit correspond to the variations shown in the FIGS. 2, 4 and 5, so that the following description makes reference to these Figures. Moreover, the description will be limited essentially to the differences with respect to the first embodiment.

In the first mode of operation for low output powers (FIG. 2) the power is again adjusted by pulse width modulation of the tank voltage, that is, the duration (first phase) T1, during which the switch S1 or S2 is conductive. The switching frequency is (constantly) lower than half the resonance frequency fres of the resonant circuit.

Thus, the first switch S1 is conductive during the first phase T1. During this phase an essentially sinusoidal current is built up until the switch S1 is switched off, that is, opened, and the second phase T2 commences. In the second phase the current commutes from the opened first switch S1 to the anti-parallel diode D2 of the second switch S2. The current decreases during this second phase T2 until it reaches the zero line and the third phase T3 commences. In this phase the diode D1, connected anti-parallel to the first switch S1, is conductive while both switches are blocked. The third phase T3 terminates when the current reaches the zero crossing again. Because the switching frequency fs is lower than half the resonance frequency fres of the resonant circuit, there is a subsequent fourth phase T4 during which no current flows through the resonant circuit (current gap/intermittent operation with DC).

This sequence is subsequently repeated by closing the second switch S2 (the first switch S1 is open) with reversed current and voltage variations in conformity with FIG. 2.

In this first mode of operation the same advantages are obtained as in the first embodiment. Notably the release time is dispensed with, because in the second half-oscillation (third phase T3) the second switch S2 is not switched on, but exclusively the diode D1, connected anti-parallel to the first switch S1, carries current.

In the second mode of operation for medium output powers the power is again adjusted by variation of the switching frequency, be it subject to the following condition: fsmin|fs|0.5*fres. The voltage and current variations then occurring are shown in FIG. 4.

During the first phase T1 the first switch S1 is conductive. The current Ires varies essentially sinusoidally and is not switched off. During the zero crossing the second phase T2 commences and the current Ires commutes from the conductive switch S1 to the anti-parallel diode D1 thereof. During this phase the current variation is a damped sinusoidal oscillation, both switches S1, S2 being blocked. Finally, in the third phase T3 no current flows through the resonant circuit.

In this second mode of operation the same advantages are obtained again as in the first mode.

Finally, there is the third mode of operation for high output powers for which the voltage and current variations are as shown in FIG. 5. The power adjustment is again realized via the switching frequency which can be varied in the range 0.5*fres|fs<fres.

During the first phase T1 the first switch S1 is switched on. The current Ires again varies essentially sinusoidally and is not switched off. During the current zero crossing the second phase T2 commences and the current commutes from the first switched-on first switch S1 to the anti-parallel diode D1 thereof. After the current zero crossing the (active) first switch S1 is opened in a currentless manner, and the variation of the current Ires is that of a damped sinusoidal oscillation. After expiration of a release time, the second switch S2 is closed while the first diode D1 still carries a current. The current then commutes from the first diode D1 to the second switch S2, so that the first phase T1 commences again with current and voltage variations of a polarity opposing that upon the closing of the first switch S1 (non-intermittent operation).

For this mode of operation the same properties and advantages are obtained again as already described with reference to the first embodiment.

Figure 8:
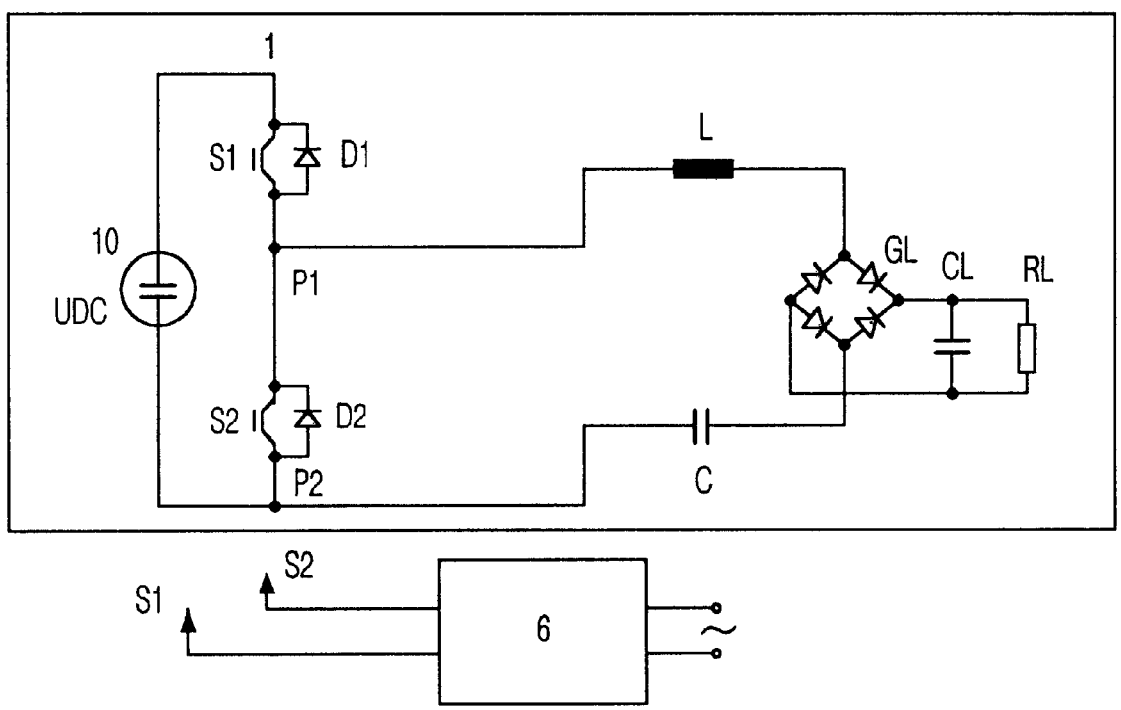
FIG. 8 shows a second circuit diagram of the second embodiment of the invention.

By way of example FIG. 8 shows a second circuit diagram of a further possibility for realizing the second embodiment of the invention. The circuit includes, connected parallel to the direct voltage source 10, a series connection of a first and a second semi-conductor switch S1, S2 which constitute the single branch 1 of an inverter and are controlled by the control unit 6, a free-running diode D1, D2 being connected anti-parallel to said switches. The series connection of the first and the second capacitor C1, C2 is thus dispensed with. This circuit of FIG. 7 for the remainder corresponds to the second embodiment, the resonant circuit being connected, for example parallel to the second semiconductor switch S2.

This second circuit for the remainder corresponds to the first circuit of FIG. 7, the semiconductor switches S1, S2 again being switched by the control unit 6 in conformity with the description given with reference to FIG. 7.

Finally, it is to be noted that, as opposed to the representation of the FIGS. 1, 7 and 8, potential separation from the load $R_L$ can be undertaken by having, for example the rectifier G1 preceded by a transformer whose primary winding inductance then forms part of the inductance of the resonant circuit.

What is claimed is:

1. A power supply unit which includes an inverter which co-operates with a resonant circuit and can be controlled by means of a control unit so as to adjust the output power, characterized in that the inverter is formed by a first switching unit and a second switching unit (S1, S4; S2, S3; S1, S2) whereby a voltage of a first polarity can be applied to the resonant circuit (L, C) in a first switching state whereas a voltage of a second polarity can be applied thereto in a second switching state, which switching states can be switched by the control unit (6) in such a manner that in a first mode of operation for low output powers the output power can be adjusted by changing the duration of the switching stage at an essentially constant switching frequency fs which is at least a predetermined factor lower than the resonance frequency fres of the resonant circuit, and that in a second mode of operation for high output powers the output power can be adjusted by changing the switching frequency in the range of the resonance frequency.

2. A power supply unit as claimed in claim 1, characterized in that each of the switching units is formed by a semiconductor switch (S1, S2) that can be switched by the control unit (6) and includes a respective anti-parallel connected diode (D1, D2), each switching unit being connected in series with a direct voltage source (10), the resonant circuit being a series resonant circuit that is connected parallel to one of the switching units.

3. A power supply unit as claimed in claim 2, characterized in that a series connection of a first and a second capacitor (C1, C2) is connected parallel to the direct voltage source (10), one terminal of the resonant circuit being connected between the first and the second semiconductor switch (S1, S2) while the other terminal is connected between the first and the second capacitor (C1, C2).

4. A power supply unit as claimed in claim 1, characterized in that the inverter includes a first and a second inverter branch (1, 2) which are connected parallel to a direct voltage source (10), each inverter branch being formed by a series connection of a first and a second or a third and a fourth semiconductor switch (S1, S2; S3, S4) with a respective anti-parallel connected diode (D1, D2; D3, D4), the first switching unit being formed by the first and the fourth semiconductor switch while the second switching unit is formed by the second and the third semiconductor switch, the resonant circuit being a series resonant circuit, one terminal of which is connected between the first and the second semiconductor switch while the other terminal is connected between the third and the fourth semiconductor switch.

5. A power supply unit as claimed in claim 4, characterized in that the control unit (6) is capable of controlling a third switching state for free running of the resonant circuit in such a manner that a series connection of one of the semiconductor switches (S1, S2; S3, S4) and one diode in a conductive phase (D1, D2; D3, D4) is connected to the resonant circuit.

6. A power supply unit as claimed in claim 1, characterized in that the factor whereby the switching frequency fs in the first mode of operation is lower than the resonance frequency amounts to 0.5.

7. A power supply unit as claimed in claim 1, characterized in that the switching frequency fs is variable in the range 0.5*fres □fs<fres in the second mode of operation.

8. A power supply unit as claimed in claim 7, characterized in that the first and the second switching state can be switched by the control unit in such a manner that in a third mode of operation for medium output powers the output power is variable by changing the switching frequency in the range fsmin|fs|0.5*fres, where fsmin is a predetermined minimum switching frequency.

9. X-ray generator with a power supply as claimed in claim 1.

* * * * *